(12) United States Patent
Raziperchikolaei

(10) Patent No.: US 11,494,644 B2
(45) Date of Patent: Nov. 8, 2022

(54) SYSTEM, METHOD, AND COMPUTER PROGRAM FOR RECOMMENDING ITEMS USING A DIRECT NEURAL NETWORK STRUCTURE

(71) Applicant: Rakuten, Inc., Tokyo (JP)

(72) Inventor: Ramin Raziperchikolaei, Foster City, CA (US)

(73) Assignee: Rakuten Group, Inc., Tokyo (JP)

( * ) Notice: Subject to any disclaimer, the term of this patent is extended or adjusted under 35 U.S.C. 154(b) by 540 days.

(21) Appl. No.: 16/689,893

(22) Filed: Nov. 20, 2019

(65) Prior Publication Data
US 2021/0150337 A1 May 20, 2021

(51) Int. Cl.
*G06N 3/08* (2006.01)
*G06N 3/04* (2006.01)

(52) U.S. Cl.
CPC ............. *G06N 3/08* (2013.01); *G06N 3/0445* (2013.01); *G06N 3/0454* (2013.01); *H04Q 2213/054* (2013.01)

(58) Field of Classification Search
CPC ...... G06N 3/08; G06N 3/0445; G06N 3/0454; H04Q 2213/054
See application file for complete search history.

(56) References Cited

U.S. PATENT DOCUMENTS

| | | | | |
|---|---|---|---|---|
| 10,769,524 | B1* | 9/2020 | Natesh | G06F 16/90335 |
| 11,004,135 | B1* | 5/2021 | Sandler | G06Q 30/0631 |
| 11,361,365 | B2* | 6/2022 | Greenwald | G06F 16/248 |
| 2020/0004835 | A1* | 1/2020 | Ramanath | G06F 16/248 |
| 2020/0004886 | A1* | 1/2020 | Ramanath | G06N 20/20 |
| 2020/0005134 | A1* | 1/2020 | Ramanath | G06N 5/003 |
| 2020/0005149 | A1* | 1/2020 | Ramanath | G06N 5/003 |
| 2020/0175022 | A1* | 6/2020 | Nowozin | G06N 3/0472 |
| 2021/0004437 | A1* | 1/2021 | Zhang | G06F 40/205 |
| 2021/0081462 | A1* | 3/2021 | Lu | G06F 16/953 |
| 2021/0097400 | A1* | 4/2021 | Lee | G06N 3/0454 |
| 2021/0133846 | A1* | 5/2021 | Xu | G06N 3/0454 |

(Continued)

OTHER PUBLICATIONS

Bronstein et al., "Data Fusion through Cross-modality Metric Learning using Similarity-Sensitive Hashing", 2010, pp. 1-8.

(Continued)

*Primary Examiner* — Kevin Ky
(74) *Attorney, Agent, or Firm* — Lessani Law Group, PC

(57) ABSTRACT

The present disclosure relates to a system, method, and computer program for recommending products using a neural network architecture that directly learns a user's predicted rating for an item from user and item data. A set of encoding neural networks maps each input source for user and item data to a lower-dimensional vector space. The individual lower-dimensional vector outputs of the encoding neural networks are combined to create a single multidimensional vector representation of user and item data. A prediction neural network is trained to predict a user's rating for an item based on the single multidimensional vector representation of user and item data. The neural network architecture allows for more efficient optimization and faster convergence that recommendations systems that rely on autoencoders. The system recommends items to users based on the users' predicted ratings for items.

20 Claims, 6 Drawing Sheets

(56) References Cited

U.S. PATENT DOCUMENTS

2021/0150337 A1* 5/2021 Raziperchikolaei ........................
G06N 3/0454
2022/0207073 A1* 6/2022 Sohail ...................... G06N 3/08

OTHER PUBLICATIONS

Cao et al., "Collective Deep Quantization for Efficient Cross-Modal Retrieval", Proceedings of the Thirty-First AAAI Conference on Artificial Intelligence, 2017, pp. 3974-3980.
Cao et al., "Correlation Hashing Network for Efficient Cross-Modal Retrieval", 2016, pp. 1-12.
Cheng et al., "Wide & Deep Learning for Recommender Systems", DLRS '16, Sep. 15, 2016, pp. 1-4.
Deng et al., "DeepCF: A Unified Framework of Representation Learning and Matching Function Learning in Recommender System", 2019, pp. 1-9.
Ding et al., "Collective Matrix Factorization Hashing for Multimodal Data", 2014, pp. 4321-4328.
Dong et al., "A Hybrid Collaborative Filtering Model with Deep Structure for Recommender Systems", Proceedings of the Thirty-First AAAI Conference on Artificial Intelligence, 2017, pp. 1309-1315.
Gong et al., "Learning Binary Codes for High-Dimensional Data Using Bilinear Projections", 2013, pp. 484-491.
Guo et al., "DeepFM: A Factorization-Machine based Neural Network for CTR Prediction", Proceedings of the Twenty-Sixth International Joint Conference on Artificial Intelligence, 2017, pp. 1725-1731.
He et al., "Neural Collaborative Filtering", WWW 2017, Apr. 3-7, 2017, pp. 1-10.
He et al., "Neural Factorization Machines for Sparse Predictive Analytics", SIGIR '17, Aug. 7-11, 2017, pp. 355-364.
He et al., "Outer Product-based Neural Collaborative Filtering", Proceedings of the Twenty-Seventh International Joint Conference on Artificial Intelligence 2018, pp. 2227-2233.
Jiang et al., "Deep Cross-Modal Hashing", 2017, pp. 3232-3240.
Koren, "Factorization Meets the Neighborhood: a Multifaceted Collaborative Filtering Model", KDD 2008, Aug. 24-27, 2008, pp. 426-434.
Kumar et al., "Learning Hash Functions for Cross-View Similarity Search", 2011, pp. 1-6.
Li et al., "Deep Binary Reconstruction for Cross-modal Hashing", MM '17, Oct. 23-27, 2017, pp. 1-8.
Li et al., "Deep Collaborative Filtering via Marginalized Denoising Auto-encoder", CIKM '15, Oct. 19-23, 2015, pp. 811-820.
Li et al., "Coupled Cycle-GAN: Unsupervised Hashing Network for Cross-Modal Retrieval", Thirty-Third AAAI Conference on Artificial Intelligence, 2019, pp. 176-183.
Li et al., "Deep Heterogeneous Autoencoders for Collaborative Filtering", 2018, pp. 1-6.
Li et al., "Self-Supervised Adversarial Hashing Networks for Cross-Modal Retrieval", 2018, pp. 4242-4251.
Lian et al., "xDeepFM: Combining Explicit and Implicit Feature Interactions for Recommender Systems", KDD 2018, Aug. 19-23, 2018, pp. 1-10.
Liu et al., "Recommender Systems with Heterogeneous Side Information", WWW '19, May 13-17, 2019, pp. 1-7.
Long et al., "Composite Correlation Quantization for Efficient Multimodal Retrieval", SIGIR '16, Jul. 17-21, 2016, pp. 1-11.
Ricci et al., "Recommender Systems Handbook", 2011.
Sedhain et al, "AutoRec: Autoencoders Meet Collaborative Filtering", WWW 2015 Companion, May 18-22, 2015, pp. 1-2.
Strub et al., "Hybrid Recommender System based on Autoencoders", Workshop on Deep Learning for Recommender Systems, Sep. 2016, pp. 1-7.
Su et al., "Deep Joint-Semantics Reconstructing Hashing for Large-Scale Unsupervised Cross-Modal Retrieval", 2019, pp. 3027-3035.
Takacs et al., "Matrix Factorization and Neighbor Based Algorithms for the Netflix Prize Problem", ReeSys 2008, Oct. 23-25, 2008, pp. 267-274.
Wang et al., "Collaborative Deep Learning for Recommender Systems", KDD '15, Aug. 10-13, 2015, pp. 1235-1244.
Wang et al., "Effective Multi-Modal Retrieval based on Stacked Auto-Encoders", Proceedings of the VLDB Endowment, Sep. 1-5, 2014, pp. 649-660.
Wu et al., "Quantized Correlation Hashing for Fast Cross-Modal Search", Proceedings of the Twenty-Fourth International Joint Conference on Artificial Intelligence, 2015, pp. 3946-3952.
Wu et al., "Unsupervised Deep Hashing via Binary Latent Factor Models for Large-scale Cross-modal Retrieval", Proceedings of the Twenty-Seventh International Joint Conference on Artificial Intelligence, 2018, p. 2854-2860.
Xue et al., "Deep Matrix Factorization Models for Recommender Systems", Proceedings of the Twenty-Sixth International Joint Conference on Artificial Intelligence, 2017, pp. 3203-3209.
Yang et al., "Shared Predictive Cross-Modal Deep Quantization", IEEE Transaction on Neural Networks and Learning Systems, 2019, pp. 1-12.
Zhang et al., "AutoSVD++: An Efficient Hybrid Collaborative Filtering Model via Contractive Auto-encoders", SIGIR '17, Aug. 7-11, 2017, pp. 957-960.
Zhang et al., "Collaborative Quantization for Cross-Modal Similarity Search", 2019, pp. 1-10.
Zhang et al., "Large-Scale Multimodal Hashing with Semantic Correlation Maximization", Association for the Advancement of Artificial Intelligence, 2014, pp. 1-7.
Japanese Office Action dated Mar. 25, 2022, Japanese Patent Application No. 2020-189584.
Xiangnan He, et al., "Neural Collaborative Filtering" Proceedings of the 26th International Conference on World Wide Web (WWW '17) [online], Apr. 3, 2017, pp. 173-182.

* cited by examiner

SYSTEM, METHOD, AND COMPUTER PROGRAM FOR RECOMMENDING ITEMS USING A DIRECT NEURAL NETWORK STRUCTURE

BACKGROUND OF THE INVENTION

1. Field of the Invention

This invention relates generally to recommendation systems and, more specifically, to a more efficient neural network structure for a recommendation system.

2. Description of the Background Art

The goal of a recommendation system is to help users identify the items that best fit their personal tastes from a large set of items. Hybrid recommendation systems use user profile information, item information, and past user ratings to make recommendations.

Some recommendation systems use neural networks to predict user ratings on items. The neural networks compress item and user data to what is relevant for predictions and use the compressed data to make the predictions. In other words, they identify the user and item characteristics that are predictive of a rating. Neural networks are trained by optimizing an objective function that helps the network achieve the desired output.

FIG. 1 illustrates the most popular neural network architecture for a recommendation system. This architecture uses two autoencoders (110, 120), one for generating a compressed representation of user data (130) and the other for generating a compressed representation of item data (135). Generating this compressed representation involves using both neural network encoders (120a, 120b, 125a, 125b) and neural network decoders (140a, 140b, 145a, 145b). In autoencoders, the encoder maps the input to a lower-dimensional representation, and the decoder takes the representation and reconstructs back the input. While training autoencoders gives us lower-dimensional user/item representations, it cannot predict the rating of the users on items.

To overcome this problem, two matrices are introduced, one with the lower-dimensional representations of all users (matrix U) and one with the lower-dimensional representations of all items (matrix V). These two matrices are learned such that the dot product of the user and item representations approximates the rating. During the training of autoencoders, the output of the encoders is constrained to be close to these two user/item representation matrices. The autoencoder-based recommendation systems are trained using an objective function that includes the matrix variables, hyperparameters, and the encoder and decoder functions. The objective function for an autoencoder-based recommendation system can be written as follows:

$$\min_{U,V,\theta} L(f^u(g^u(R, X))) + L(f^i(g^i(R, Y))) + \lambda_1 \|U - g^u(R, X)\|^2 +$$
$$\lambda_2 \|V - g^i(R, Y)\|^2 + \lambda_3 \sum_{j,k} \|R_{jk} - U_{j,:}^T V_{k,:}\|^2 + \text{regulation terms}$$

Where:
L() is the reconstruction loss;
$g^u$ is the encoder for user data;
$f^u$ is the decoder for user data;
$g^i$ is the encoder for item data;
$g^u$ is the decoder for item data;
U is the matrix with lower-dimensional representations of all users;
V is the matrix with lower-dimensional representations of all items;
$R \in \mathbb{R}^{m \times n}$ contains the available ratings for m users and n items, where $R_{jk}$ is the rating of user j on item k;
θ contains all parameters of the two autoencoders; and
$\lambda_1, \lambda_2,$ and $\lambda_3$ are the hyperparameters.

There are a number of disadvantages with using this structure. First, optimization is difficult and time consuming because the user and item matrices (i.e., matrix U and V) are huge and need alternating optimization between the matrices and neural network parameters. Second, the use of these matrix variables requires three hyperparameters (i.e., $\lambda_1, \lambda_2, \lambda_3$) in the objective function, which can be difficult to set. Third, the fact that an autoencoder has both an encoder and a decoder, each with their own parameters, means that there are a larger number of neural network parameters than is desired for efficient and accurate predictions.

SUMMARY OF THE DISCLOSURE

The present disclosure relates to a system, method, and computer program for recommending products using neural networks. The recommendation system uses a neural network architecture that directly learns a user's predicted rating for an item from one or more sources of data related to the user and one or more sources of data related to the item. A set of encoding neural networks maps each input source for user and item data to a lower-dimensional vector space. The individual lower-dimensional vector outputs of the encoding neural networks are combined to create a single multidimensional vector representation of user and item data. A prediction neural network is trained to predict a user's rating for an item based on the single multidimensional vector representation of user and item data. The system recommends items to users based on the users' predicted ratings for items.

Unlike recommendation systems that uses the neural network structure of FIG. 1, the method disclosed herein does not require use of decoders in the neural network structure. As a result, there are fewer network parameters with the disclosed method, resulting in faster convergence. Also, the method disclosed herein does not require computing and optimizing the large matrices with the user and item representations in the prior art method (e.g., matrices U and V in FIG. 1). This leads to an end-to-end training of all the variables, which is faster and easier than the alternating optimization approach of the previous works. This also allows the objective function for training the neural networks to have fewer hyper-parameters (i.e., one vs. three in the prior art).

In one embodiment, a method for recommending products to users using a direct neural network structure comprises the following steps:

performing the following with respect to a training phase:
(a) for a training user in a training data set with a known rating on an item, receiving one or more input vectors with user data for the training user and one or more input vectors with item data for the item;
(b) using a set of encoding neural networks to map each input vector to a lower-dimensional vector space, resulting in one or more lower-dimensional vectors for the user data and one or more lower-dimensional vectors for the item data, wherein a separate encoding neural network is used for each input vector, and wherein the lower-dimensional user and item vectors are lower dimensional as compared to the corresponding input vectors;

(c) creating a single multidimensional vector representation of user and item data based on the one or more lower-dimensional user vectors and the one or more lower-dimensional item vectors;

(d) using a prediction neural network to calculate a predicted rating for the item by the training user based on the single multidimensional vector representation of the training user and item data;

(e) calculating an error value between the training user's predicted rating for the item and the training user's known rating for the item;

(f) performing steps (a)-(e) with respect to a plurality of training users in the training data set;

(g) updating parameters of the encoding neural networks and the prediction neural network to minimize the error values for the plurality of training users;

(h) repeating steps (a)-(g) for a number of iterations to train the encoding neural networks and the prediction neural network;

performing the following with respect to a prediction and recommendation phase:

(i) receiving one or more input vectors with user data for a test user and one or more input vectors with item data for an item unrated by the test user;

(j) using the set of encoding neural networks to map each input vector to a lower-dimensional vector space, resulting in one or more lower-dimensional vectors for the user data and one or more lower-dimensional vectors for the item data, wherein a separate encoding neural network is used for each input vector, and wherein the lower-dimensional user and item vectors are lower dimensional as compared to the corresponding input vectors;

(k) creating a single multidimensional vector representation of user and item data based on the one or more lower-dimensional user vectors and the one or more lower-dimensional item vectors;

(l) using the prediction neural network to calculate a predicted rating for the item by the test user based on the single multidimensional vector representation of user and item data;

(m) repeating steps (i)-(l) with respect to the test user and a plurality of items unrated by the test user; and (n) using the test user's predicted ratings for the plurality of items to recommend one or more items to the test user.

DETAILED DESCRIPTION OF THE PREFERRED EMBODIMENTS

The present disclosure relates to a system, method, and computer program for recommending products using neural networks. The methods disclosed herein are performed by a computer system ("the system").

Figure 4:
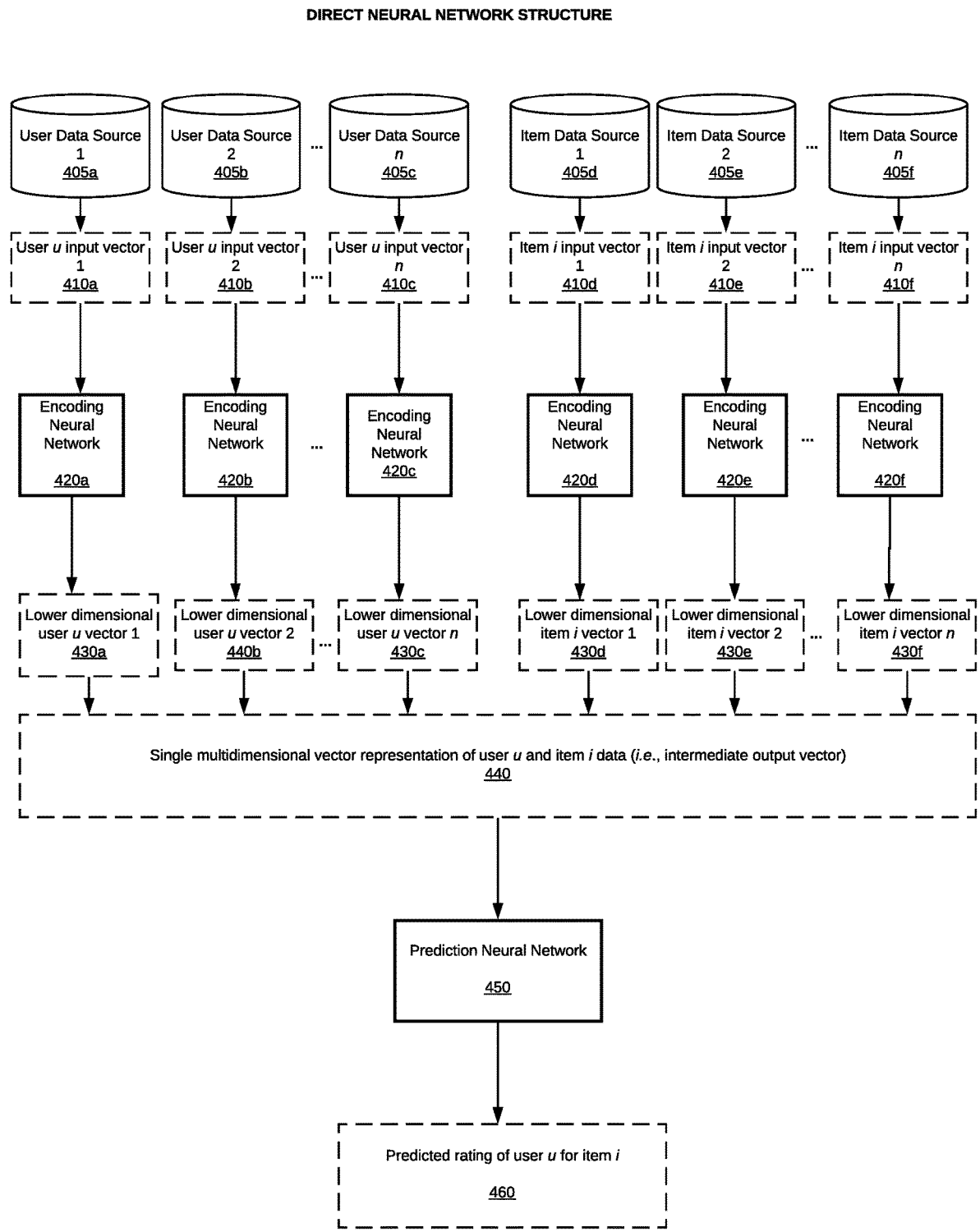
FIG. 4 is a block diagram of an example direct neural network architecture for a recommendation system.

As described in more detail below, the system uses a neural network architecture that directly learns a user's predicted rating for an item from data related to the user and the item. The process is direct in that the system encodes data related to the particular user and the particular item, and outputs a prediction from the encoded data, without requiring any decoding of the representations or calculating dot products of huge matrices with representations for all users and all items. An example of the neural network architecture is illustrated in FIG. 4. The system uses the predicted ratings to recommend products to users.

The method includes a training phase and a prediction and recommendation phase. In the training phase, the neural networks in the system are trained to predict a user rating on an item based on encoded representations of user and item data. In the prediction and recommendation phase, the trained neural networks are used to predict user ratings, and the system uses the predicted ratings to recommend products. These phases may be performed by different entities (e.g., one entity may train the neural networks, and another entity may use the trained networks to make product recommendations). Each of these phases is described below.

1. Training Phase 1.1 Inputs

Figure 2A:
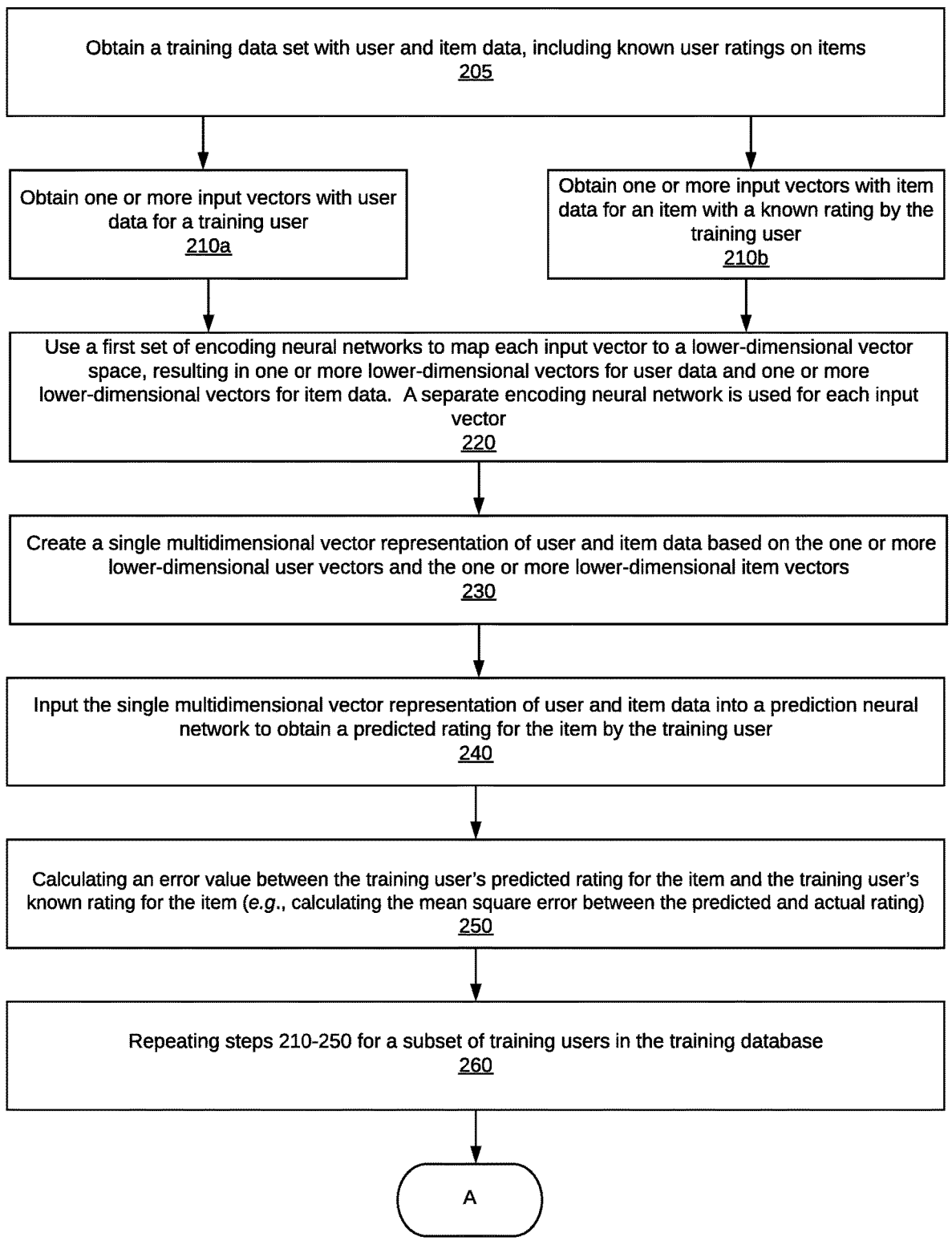
FIGS. 2A-B are flowcharts that illustrate a method, according to one embodiment, for training a neural network system to predict a user rating of an item.
Figure 2B:
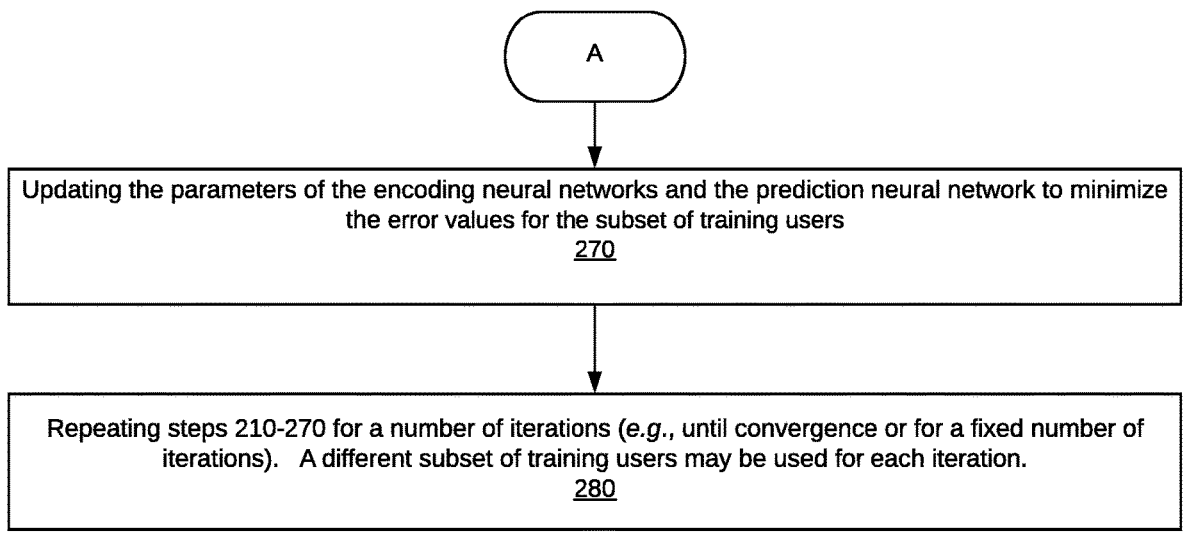

FIGS. 2A-B illustrate a method for training the system to predict a user rating on an item. The method is described with respect to the neural network architecture of FIG. 4. The system obtains a training data set with training user and item data, including known training user ratings on items (step 205). The training data set may have one or more user data sources and one or more item data sources (e.g., see data sources 405$a$-$f$ in FIG. 4). From the training data set, the system obtains one or more input vectors with user data for a training user, as well as one or more input vectors with item data for an item with a known rating by the training user (e.g., see input vectors 410$a$-$f$ in FIG. 4) (steps 210$a$-$b$).

In one embodiment, the user data includes the user's past rating on items and the user's profile information, and the item data includes past ratings for the item from other users and item profile data. User profile data may include one or more of the following: user age, user location, user gender, user occupation, user income range, and user ethnicity. The user data may be provided by a user and/or derived by the system using machine learning. The item profile data may include one or more of the following: item description, item price, item category, and item image. As shown in FIG. 4, each data source may correspond to a separate input vector.

The number of input sources is generally proportional to the accuracy of the ratings predictions, as well as the computational time and cost associated with the predictions. In other words, the more input and user data sources, the more accurate the ratings predictions likely will be. However, the more input sources, the greater the computational time and cost associated with making the predictions.

Below are examples of how user and item data may be represented as vectors.

User Gender

One type of user profile information may be gender. In this example, user #0 is a female, and the input vector corresponding to the gender of user #0 is:

TABLE 1

| User | Male | Female |
|---|---|---|
| User #0 | 0 | 1 |

Product Category

One type of item profile data may be item category. In this example, there are a total of n categories (where n is an integer >3 in this example), and item #0 belongs to category_2. The input vector corresponding to the category profile information of item #0 is:

TABLE 2

| Item | Category_0 | Category_1 | Category_2 | Category_3 | ... | ... | Category_n |
|---|---|---|---|---|---|---|---|
| Item_0 | 0 | 0 | 1 | 0 | 0 | 0 | 0 |

User's Past Ratings:

This example illustrates how a user' past ratings may be represented as a vector. For simplicity purposes, this example assumes that there are five items: item_1 to item_5, and the following is the past ratings of the ith user:

TABLE 3

| Item_1 | Rating = 3 |
|---|---|
| Item_3 | Rating = 5 |
| Item_5 | Rating = 2 |

Note that the ratings of user i on item_2 and item_4 are unknown. The input vector corresponding to the past ratings of user i is a five-dimensional vector, as follows:

TABLE 4

| 3 | 0 | 5 | 0 | 2 |
|---|---|---|---|---|

The vector is five dimensional because there are five items. The first index of the vector contains the rating for item_1, the second index contains the rating for item_2, and so on. For items with an unknown rating, zero is inserted in the corresponding index.

1.2 Mapping Input to a Lower Dimensional Space

The system uses a first set of neural network encoders to map each input vector to a lower-dimensional vector space (as compared to the input vector space), resulting in one or more lower-dimensional vectors for item data and one or more lower-dimensional vectors for user data (e.g., see neural network encoders 420a-f, lower dimensional user vectors 430a-c, and lower-dimensional item vectors 430d-f in FIG. 4) (step 220). There is a separate neural network encoder for each input vector.

The neural network encoders 420 may be any neural network that can receive a multidimensional input vector and generate a lower-dimensional representation of the vector. For example, the neural network encoders may be multilayer perceptrons, a long short-term network (LSTM), or a convolutional network.

The one or more lower dimensional user vectors and the one or more lower-dimensional item vectors are combined to create a single multidimensional vector representation of user and item data (step 230). This is illustrated as intermediate output vector 440 in FIG. 4. In one embodiment, the intermediate output vector is created by concatenating all the lower-dimensional user and item vectors together. The lower-dimensional user and item vectors may be concatenated in any order, provided the order is the same in both the training and prediction phases. In other embodiments, the lower-dimensional user and item vectors are combined in more complicated ways, such the combination of concatenation and entry-wise product, which may increase accuracy of predictions, but also increase computational time and resources.

1.3 Predicting User Rating

The single multidimensional vector representation of user and item data is then inputted to another neural network that maps the multidimensional vector representation of user and item data to a predicted user rating of the item (e.g., see prediction neural network 450 in FIG. 4) (step 240). This neural network is referred to herein as the "prediction neural network." The output of the prediction neural network is the user's predicted rating for the item.

The prediction neural network 450 may be any neural network that can receive a multidimensional vector input and output a scalar value that is predictive of a user rating (e.g., a multilayer perceptron).

1.4 Updating Parameters of Neural Networks

The system calculates an error value between the training user's predicted rating for an item and the training user's known rating for the item (step 250). For example, the system may calculate the mean square error between the predicted and actual rating as follows:

$$RMSE(X, h) = \sqrt{\frac{1}{m}\sum_{i=1}^{m}(h(x^{(i)}) - y^{(i)})^2}$$

Where:

m is the number of observations;

h(x) is the predicted responses; and y is the target response.

Another option for the error value is the mean absolute error between the actual and predicted response.

The system repeats steps 210-250 for all or a subset of training users in the training database (step 260). The system updates the parameters of the encoding neural networks and the prediction neural network to minimize the error values for the set/subset of training users (step 270). In one embodiment, the optimization function used to train the neural networks is as follows:

$$\min_{\theta}\sum_{j,k}\|R_{jk} - h(z_{jk})\|^2 + \lambda_1\|\theta\|^2$$

Where:

θ contains all parameters of the encoding and prediction neural networks;

$R_{jk}$ is the rating of user j for item k;

$z_{jk}$ is the single multidimensional representation of the user and item data (i.e., the concatenation of outputs of the encoding neural networks);

h( ) is the prediction neural network; and $\lambda_1$ is the hyperparameter.

The system repeats steps 210-270 for a number of iterations (step 280). Either the same set of training users or a different subset of training users may be used for each iteration. In one embodiments, the steps are repeated until convergence is achieved. In an alternate embodiment, the steps are repeated for a fixed number of iterations (e.g., a 1,000 iterations).

2. Prediction and Recommendation

Figure 3:
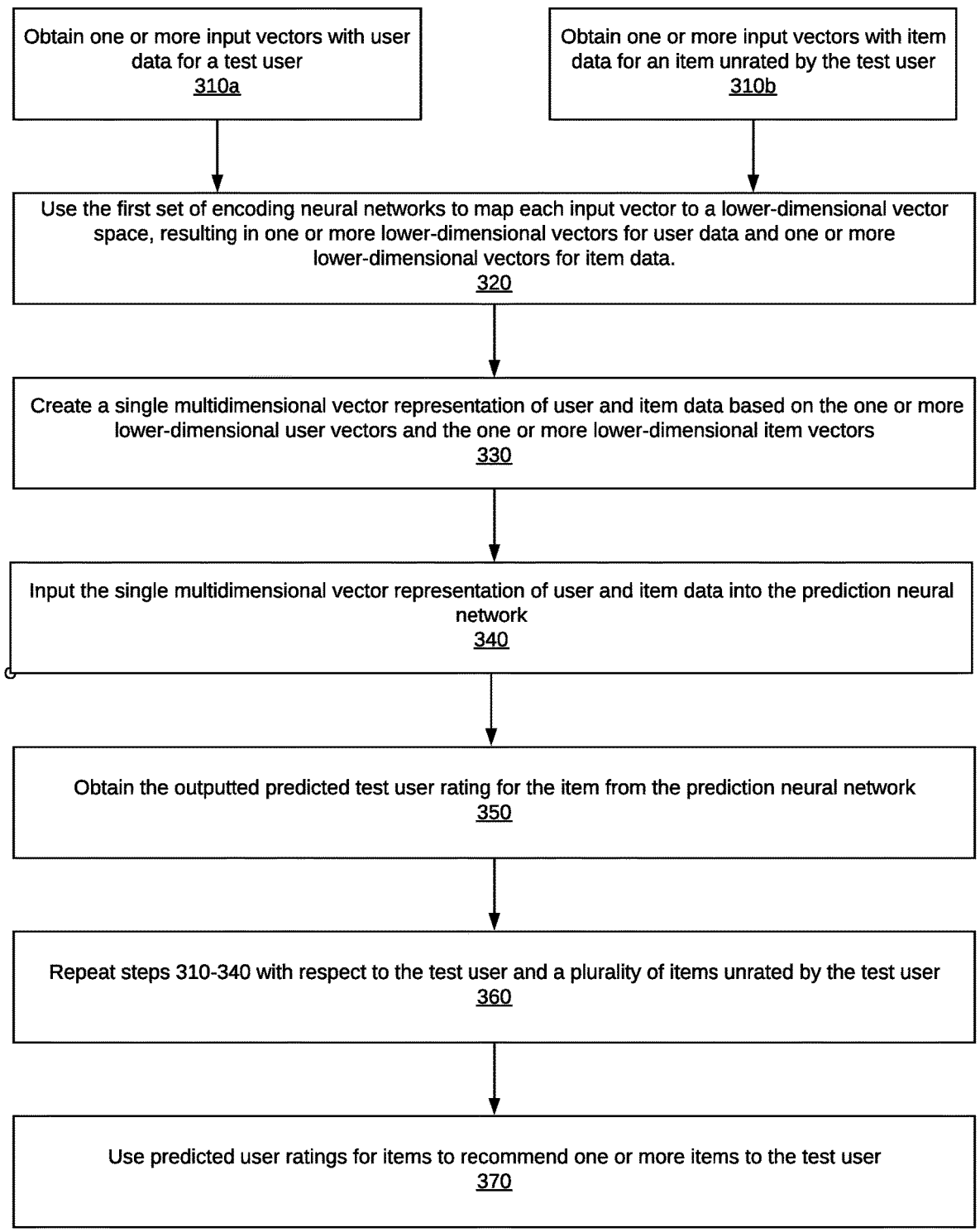
FIG. 3 is a flowchart that illustrates a method, according to one embodiment, for predicting a user's ratings on a number of items and recommending items to the user based on the ratings.

FIG. 3 illustrates a method for predicting a user's ratings on a number of items and recommending items to the user based on the ratings. The method uses the trained encoding neural networks and prediction neural network described above. Step 310-340 are the same as steps 210-240 in FIG. 2A, except they are performed with respect to a test user (i.e., a non-training user) and an item unrated by the test user. Specifically, one or more input vectors with test user data and one or more vectors with item data are inputted into the encoding networks, which results in one or more lower-dimensional vectors for test user data and one or more lower-dimensional vectors for item data (steps 310-320). The same types of user and item data are used in this phase as in the training phase. The lower-dimensional test user and item vectors are used to create a single multidimensional vector representation of test user and item data (step 330). The single multidimensional vector is inputted into the prediction neural network, which outputs a predicted rating for the item by the test user (steps 340-350).

The system then repeats the above steps (i.e., steps 310-350) with respect to the test user and each of a plurality of items unrated by the test user (step 360). The system uses the predicted ratings to recommend one or more items to the test user (step 370). For example, the system may recommend the items with the top n predicted ratings for the test user (e.g., n=5).

3. Advantages

Figure 1:
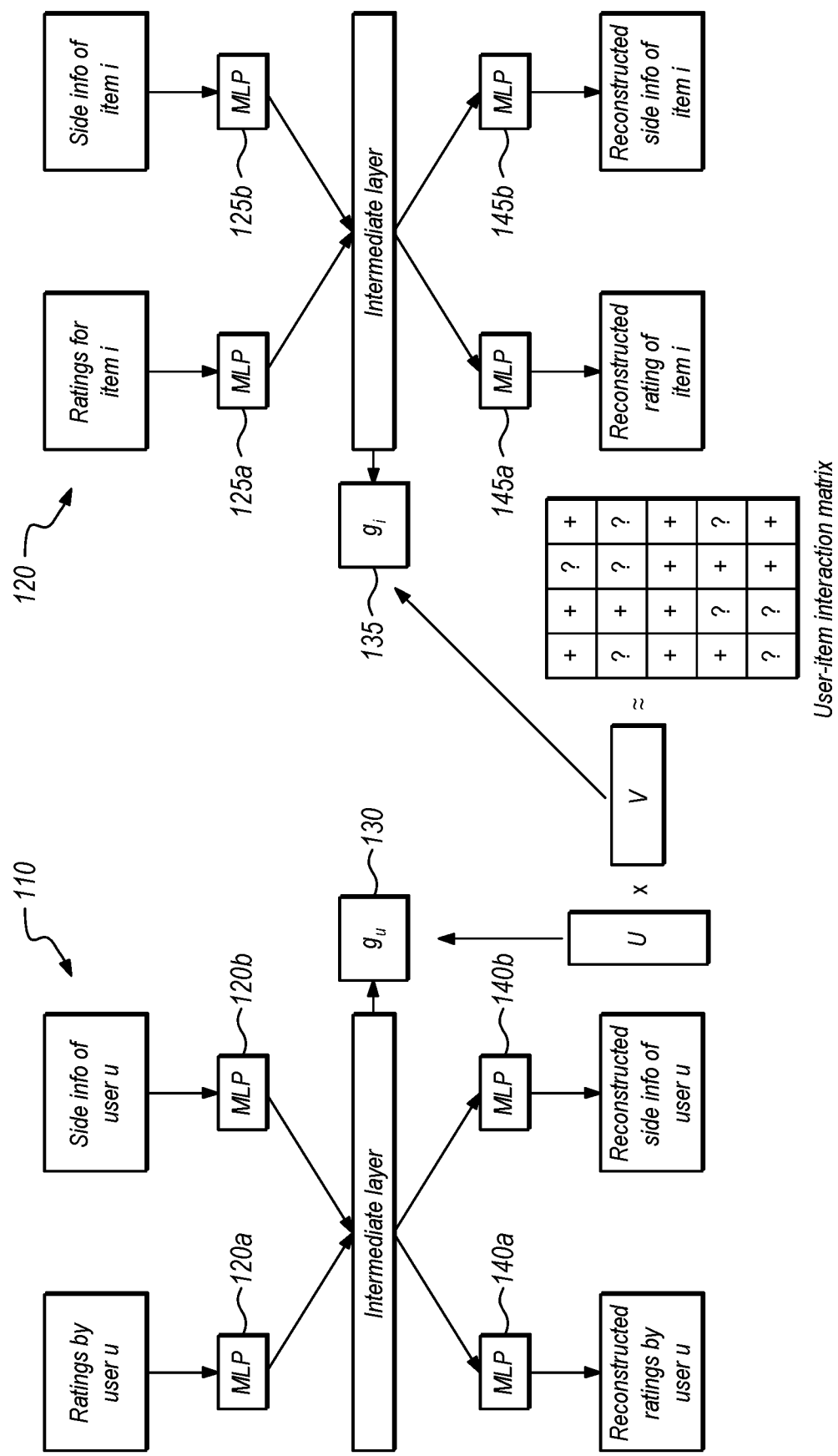
FIG. 1 illustrates a neural network architecture used in prior art recommendation systems.

Unlike recommendation systems that uses the neural network structure of FIG. 1, the method disclosed with respect to FIGS. 2-4 does not require use of decoders in the neural network structure. As a result, there are fewer network parameters with the disclosed method, resulting in faster convergence. Also, the method disclosed herein does not require computing and optimizing the large matrices with the user and item representations in the prior art method (e.g., matrices U and V in FIG. 1). This leads to an end-to-end training of all the variables, which is faster and easier than the alternating optimization approach of the previous works. This also allows the objective function for training the neural networks to have fewer hyper-parameters (i.e., one vs. three in the prior art).

4. Example Recommendation System

Figure 5:
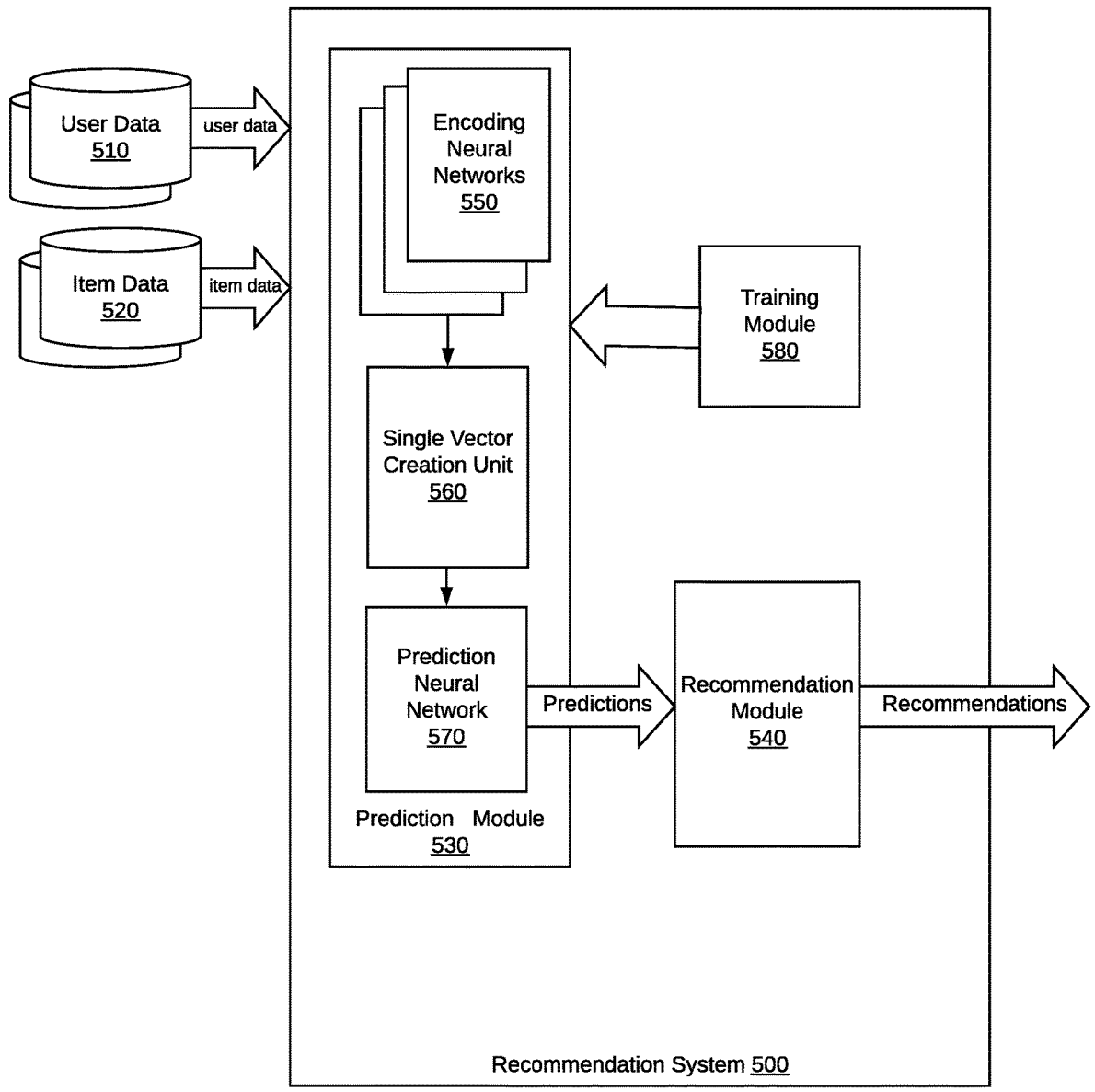
FIG. 5 is a block diagram of an example recommendation system.

FIG. 5 illustrates an example recommendation system software architecture. The recommendation system 500 receives user and item data from multiple data sources 510, 520. A prediction module 530 predicts users' ratings for items. The prediction module includes encoding neural networks 550, a single vector creation unit 560 that creates the single multidimensional vector representation of user and item data, and the prediction neural network 570. Training module 580 trains the prediction module 530 in accordance with the method of FIGS. 2A-B. The prediction module 530 makes predictions based on the method of FIG. 3. A recommendation module 540 receives the predicted user ratings and recommends items to users based on the predictions. For example, it may select products associated with the n highest predicted ratings after factoring in any applicable business rules. Those skilled in the art will appreciate that a recommendation system may have other modules that are not relevant to the disclosure herein.

In one embodiment, each of the encoding neural networks and the prediction network is a multi-layer network with nonlinear activation functions (i.e., a non-linear function is applied to the output of each neuron of the network, which makes the neural network a complex and nonlinear function of the input). In an alternate embodiment, each of the encoding and prediction neural networks contains a single layer with linear (identity) activation function (i.e., the output of each neural network is a linear transformation of its input). Using linear activation functions reduces the computational time and cost associated with making predictions, but decreases the accuracy as compared to networks with nonlinear activation functions.

5. General

The methods described with respect to FIGS. 1-5 are embodied in software and performed by a computer system (comprising one or more computing devices) executing the software. A person skilled in the art would understand that a computer system has one or more physical memory units, disks, or other physical, computer-readable storage media for storing software instructions, as well as one or more processors for executing the software instructions. A person skilled in the art would also understand that a computer system may be stand-alone or connected to a computer network as a server.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for automatically recommending one or more items to a user using neural networks, the method comprising:

performing the following with respect to a training phase:
   (a) for a training user in a training data set with a known rating on an item, receiving one or more input vectors with user data for the training user and one or more input vectors with item data for the item;
   (b) using a set of encoding neural networks to map each input vector to a lower-dimensional vector space, resulting in one or more lower-dimensional vectors for the user data and one or more lower-dimensional vectors for the item data, wherein a separate encoding neural network is used for each input vector, and wherein the lower-dimensional user and item vectors are lower dimensional as compared to the corresponding input vectors;
   (c) creating a single multidimensional vector representation of user and item data based on the one or more lower-dimensional user vectors and the one or more lower-dimensional item vectors;
   (d) using a prediction neural network to calculate a predicted rating for the item by the training user based on the single multidimensional vector representation of the training user and item data;
   (e) calculating an error value between the training user's predicted rating for the item and the training user's known rating for the item;

(f) performing steps (a)-(e) with respect to a plurality of training users in the training data set;
(g) updating parameters of the encoding neural networks and the prediction neural network to minimize the error values for the plurality of training users;
(h) repeating steps (a)-(g) for a number of iterations to train the encoding neural networks and the prediction neural network;

performing the following with respect to a prediction and recommendation phase:
(i) receiving one or more input vectors with user data for a test user and one or more input vectors with item data for an item unrated by the test user;
(j) using the set of encoding neural networks to map each input vector to a lower-dimensional vector space, resulting in one or more lower-dimensional vectors for the user data and one or more lower-dimensional vectors for the item data, wherein a separate encoding neural network is used for each input vector, and wherein the lower-dimensional user and item vectors are lower dimensional as compared to the corresponding input vectors;
(k) creating a single multidimensional vector representation of user and item data based on the one or more lower-dimensional user vectors and the one or more lower-dimensional item vectors;
(l) using the prediction neural network to calculate a predicted rating for the item by the test user based on the single multidimensional vector representation of user and item data;
(m) repeating steps (i)-(l) with respect to the test user and a plurality of items unrated by the test user; and
(n) using the test user's predicted ratings for the plurality of items to recommend one or more items to the test user.

2. The method of claim 1, wherein the user data includes past user ratings and user profile data, and wherein the item data includes past ratings received for the item from other users and item profile data.

3. The method of claim 2, wherein user profile data includes one or more of the following: user age, user location, user gender, user occupation, and user income range.

4. The method of claim 2, wherein item profile data includes one or more of the following: item description, item price, item category, and item image.

5. The method of claim 1, wherein the error value is the mean square error between the training user's predicted rating and the training user's known rating, and wherein, in step (g), the parameters of the encoding neural networks and the prediction neural network are adjusted to minimize said mean square error for the plurality of training users.

6. The method of claim 1, wherein the prediction neural network is a multilayer perceptron and the set of encoding neural networks comprise one or more of the following: a multilayer perceptron, a long short-term memory network, and convolutional neural network.

7. The method of claim 1, wherein, in both the training and prediction phases, the single multidimensional vector representation of user and item data is obtained by concatenating the one or more lower-dimensional user vectors and the one or more lower dimensional item vectors.

8. The method of claim 1, wherein a different subset of training users within the training data set is used for each iteration of steps (a)-(g).

9. A non-transitory computer-readable medium comprising a computer program that, when executed by a computer system, enables the computer system to perform the following method for automatically recommending one or more items to a user using neural networks, the method comprising:

performing the following with respect to a training phase:
(a) for a training user in a training data set with a known rating on an item, receiving one or more input vectors with user data for the training user and one or more input vectors with item data for the item;
(b) using a set of encoding neural networks to map each input vector to a lower-dimensional vector space, resulting in one or more lower-dimensional vectors for the user data and one or more lower-dimensional vectors for the item data, wherein a separate encoding neural network is used for each input vector, and wherein the lower-dimensional user and item vectors are lower dimensional as compared to the corresponding input vectors;
(c) creating a single multidimensional vector representation of user and item data based on the one or more lower-dimensional user vectors and the one or more lower-dimensional item vectors;
(d) using a prediction neural network to calculate a predicted rating for the item by the training user based on the single multidimensional vector representation of the training user and item data;
(e) calculating an error value between the training user's predicted rating for the item and the training user's known rating for the item;
(f) performing steps (a)-(e) with respect to a plurality of training users in the training data set;
(g) updating parameters of the encoding neural networks and the prediction neural network to minimize the error values for the plurality of training users;
(h) repeating steps (a)-(g) for a number of iterations to train the encoding neural networks and the prediction neural network;

performing the following with respect to a prediction and recommendation phase:
(i) receiving one or more input vectors with user data for a test user and one or more input vectors with item data for an item unrated by the test user;
(j) using the set of encoding neural networks to map each input vector to a lower-dimensional vector space, resulting in one or more lower-dimensional vectors for the user data and one or more lower-dimensional vectors for the item data, wherein a separate encoding neural network is used for each input vector, and wherein the lower-dimensional user and item vectors are lower dimensional as compared to the corresponding input vectors;
(k) creating a single multidimensional vector representation of user and item data based on the one or more lower-dimensional user vectors and the one or more lower-dimensional item vectors;
(l) using the prediction neural network to calculate a predicted rating for the item by the test user based on the single multidimensional vector representation of user and item data;
(m) repeating steps (i)-(l) with respect to the test user and a plurality of items unrated by the test user; and
(n) using the test user's predicted ratings for the plurality of items to recommend one or more items to the test user.

10. The non-transitory computer-readable medium of claim 9, wherein the user data includes past user ratings and user profile data, and wherein the item data includes past ratings received for the item from other users and item profile data.

11. The non-transitory computer-readable medium of claim 10, wherein user profile data includes one or more of the following: user age, user location, user gender, user occupation, and user income range.

12. The non-transitory computer-readable medium of claim 10, wherein item profile data includes one or more of the following: item description, item price, item category, and item image.

13. The non-transitory computer-readable medium of claim 9, wherein the error value is the mean square error between the training user's predicted rating and the training user's known rating, and wherein, in step (g), the parameters of the encoding neural networks and the prediction neural network are adjusted to minimize said mean square error for the plurality of training users.

14. The non-transitory computer-readable medium of claim 9, wherein the prediction neural network is a multilayer perceptron and the set of encoding neural networks comprise one or more of the following: a multilayer perceptron, a long short-term memory network, and convolutional neural network.

15. The non-transitory computer-readable medium of claim 9, wherein, in both the training and prediction phases, the single multidimensional vector representation of user and item data is obtained by concatenating the one or more lower-dimensional user vectors and the one or more lower dimensional item vectors.

16. The non-transitory computer-readable medium of claim 9, wherein a different subset of training users within the training data set is used for each iteration of steps (a)-(g).

17. A non-transitory computer-readable medium comprising a computer program that, when executed by a computer system, enables the computer system to perform the following method for training a neural network system to predict a user rating for an item, the method comprising:
   (a) for a training user in a training data set with a known rating on an item, receiving one or more input vectors with user data for the training user and one or more input vectors with item data for the item;
   (b) using a set of encoding neural networks to map each input vector to a lower-dimensional vector space, resulting in one or more lower-dimensional vectors for the user data and one or more lower-dimensional vectors for the item data, wherein a separate encoding neural network is used for each input vector, and wherein the lower-dimensional user and item vectors are lower dimensional as compared to the corresponding input vectors;
   (c) creating a single multidimensional vector representation of user and item data based on the one or more lower-dimensional user vectors and the one or more lower-dimensional item vectors;
   (d) using a prediction neural network to calculate a predicted rating for the item by the training user based on the single multidimensional vector representation of the training user and item data;
   (e) calculating an error value between the training user's predicted rating for the item and the training user's known rating for the item;
   (f) performing steps (a)-(e) with respect to a plurality of training users in the training data set;
   (g) updating parameters of the encoding neural networks and the prediction neural network to minimize the error values for the plurality of training users; and
   (h) repeating steps (a)-(g) for a number of iterations to train the encoding neural networks and the prediction neural network.

18. The non-transitory computer-readable medium of claim 17, wherein the user data includes past user ratings and user profile data, and wherein the item data includes past ratings received for the item from other users and item profile data.

19. A non-transitory computer-readable medium comprising a computer program that, when executed by a computer system, enables the computer system to perform the following method for automatically recommending one or more items to a user using neural networks, the method comprising:
   (a) receiving one or more input vectors with user data for a user and one or more input vectors with item data for an item unrated by the user;
   (b) using a set of encoding neural networks to map each input vector to a lower-dimensional vector space, resulting in one or more lower-dimensional vectors for the user data and one or more lower-dimensional vectors for the item data, wherein a separate encoding neural network is used for each input vector, and wherein the lower-dimensional user and item vectors are lower dimensional as compared to the corresponding input vectors;
   (c) creating a single multidimensional vector representation of user and item data based on the one or more lower-dimensional user vectors and the one or more lower-dimensional item vectors;
   (d) using a prediction neural network to calculate a predicted rating for the item by the user based on the single multidimensional vector representation of user and item data, wherein the set of encoding neural networks and the prediction neural network were previously trained to perform steps (b)-(d);
   (e) repeating steps (a)-(d) with respect to the user and a plurality of items unrated by the user; and
   (f) using the user's predicted ratings for the plurality of items to recommend one or more items to the user.

20. The non-transitory computer-readable medium of claim 19, wherein the user data includes past user ratings and user profile data, and wherein the item data includes past ratings received for the item from other users and item profile data.

* * * * *